United States Patent [19]  [11] Patent Number: 4,804,494
Egerton et al.  [45] Date of Patent: Feb. 14, 1989

[54] WOOD PRESERVATIVE COMPOSITIONS AND A PROCESS FOR THEIR PRODUCTION

[75] Inventors: Ian K. Egerton, Runcorn; Andrew D. J. Broome, Warrington, both of United Kingdom

[73] Assignee: Laporte Industries Limited, London, England

[21] Appl. No.: 41,720

[22] Filed: Apr. 23, 1987

[30] Foreign Application Priority Data

May 7, 1986 [GB] United Kingdom ............... 8611094

[51] Int. Cl.⁴ ............... C01G 37/14; C01G 28/02; C09K 15/00; A01N 59/22
[52] U.S. Cl. ............... 252/397; 106/15.05; 252/607; 423/595; 423/602; 423/604; 424/133; 424/137; 424/140
[58] Field of Search ............... 252/397, 400.53, 601, 252/607, 385, 400.5, 400.54, 186.27, 186.28, 186.43; 424/140, 141, 143, 130, 133, 137, DIG. 11, DIG. 8; 106/15.05; 423/595, 601, 602, 604, 607, 617; 426/335, 532; 427/351, 439, 440

[56] References Cited

U.S. PATENT DOCUMENTS

| | | | |
|---|---|---|---|
| 1,620,152 | 3/1927 | Curtin | 424/133 |
| 2,313,588 | 3/1943 | Siebert et al. | 424/133 |
| 2,313,589 | 3/1943 | Siebert et al. | 424/133 |
| 2,573,252 | 10/1951 | Farber | 424/133 |
| 3,080,212 | 3/1963 | Oberley et al. | 424/137 |
| 3,957,494 | 5/1976 | Oberley | 424/140 |
| 4,038,086 | 7/1977 | Clarke et al. | 424/140 |
| 4,103,000 | 7/1978 | Hartford | 424/133 |
| 4,218,249 | 8/1980 | Hill | 424/140 |
| 4,247,329 | 1/1981 | Mills | 424/140 |
| 4,357,261 | 11/1982 | Takahashi et al. | 424/133 |
| 4,622,248 | 11/1986 | Leach et al. | 424/141 |

OTHER PUBLICATIONS

Hawley, G. 1981, The Condensed Chemical Dictionary, 10th edition, Van Nostrand Reinhold Co., New York, p. 545.

Primary Examiner—Howard J. Locker
Attorney, Agent, or Firm—Kane, Dalsimer, Sullivan, Kurucz, Levy, Eisele and Richard

[57] ABSTRACT

A copper arsenate composition suitable for incorporation in a copper/chrome/arsenic wood preservative composition is made by reacting copper metal with a source of 5-valent arsenic such as arsenic acid under the oxidizing influence of hydrogen peroxide. The quantity of arsenic acid used may be made consistent with the arsenic to copper ratio required in the final wood preservative composition which may be made up by including a suitable source of chromium with the copper arsenate reaction product.

9 Claims, No Drawings

WOOD PRESERVATIVE COMPOSITIONS AND A PROCESS FOR THEIR PRODUCTION

BACKGROUND OF THE INVENTION

1. Field of the Invention

This invention relates to wood preservative compositions containing copper arsenate and to a method for their production.

2. Brief Description of the Prior Art

Compositions containing, as active ingredients, compounds of copper, of chromium and of arsenic, hereafter called copper/chrome/arsenic compositions, are in widespread use as wood preservatives. Such compositions are required to be water-soluble and are generally made available as pastes, as slurries of solid and solution, or as concentrated solutions, each for dissolution and/or dilution in water before use.

The British Standards Institution has published British Standard No. 4072 relating to the composition of copper/chrome/arsenic compositions and their use in the treatment of wood. This Standard specifies two formulations identified as Type 1 and Type 2 having overall weight compositions as follows:

|  | Type 1 | Type 2 |
|---|---|---|
| Copper sulphate - expressed as $CuSO_4 5H_2O$ | 32.6% | 35.0% |
| Dichromate - expressed as $K_2Cr_2O_7$ or $Na_2Cr_2O_7.2H_2O$ | 41.0% | 45.0% |
| Arsenic - expressed as $As_2O_5.2H_2O$ | 26.4% | 20.0% |

Similar compositions have been Standardised by the American Wood Preservers Association as Types A, B and C having overall compsitions as follows:

|  | Type A | Type B | Type C |
|---|---|---|---|
| Copper sulphate - expressed as CuO | 18.1 | 19.6 | 18.5 |
| Sodium dichromate - expressed as $CrO_3$ | 65.5 | 35.3 | 47.5 |
| Arsenic - expressed as $As_2O_5$ | 16.4 | 45.1 | 34.0 |

The above Standards illustrate the range of copper:chromium:arsenic ratios commonly used for wood preservative purposes. The ingredients used to attain such ratios are varied somewhat subject to constraints arising from the avoidance or reduction of the content of undesired impurities, for example the sulphate and/or nitrate anions, in the compositions or arising from the need for water solubility in the composition at least at the final treatment concentration.

U.S. Pat. No. 4,103,000 describes the production of copper/chrome/arsenic wood preservative compositions corresponding to Types A, B and C identified above from copper arsenate and chromic acid and also describes a process for the production of slurries of copper arsenate suitable for such use. The last mentioned process comprises reacting copper metal with arsenic acid at a temperature of 100° C. in the presence of an oxidising agent and of an acid catalyst selected from the group consistng of nitric acid, hydrochloric acid and sulphuric acid. Oxygen is sparged into the reaction mixture, preferably under pressure, as the oxidising agent, although if nitric acid is selected as the catalyst oxygen need not essentially be used.

SUMMARY OF THE INVENTION

The present invention provides the production of copper arsenate by a new or improved process and the conversion of the copper arsenate so produced into copper/chrome/arsenic wood preservative compositions.

A basis of the present invention is the selection of hydrogen peroxide as an oxidising agent together with the realisation that if this oxidising agent is utilised within suitably controlled process parameters a catalyst for the production of copper arsenate may be omitted.

According to one aspect thereof the present invention therefore provides a process for the production of copper arsenate suitable for conversion into a copper/chrome/arsenic wood preservative composition by reacting copper metal with a source of 5-valent arsenic in an aqueous phse in the presence of an oxidiing agent characterised in that the oxidising agent consists essentially of hydrogen peroxide. In the practice of this invention contamination of wood preservative compositions made from copper arsenate so produced by acid anions derived from the catalysts described in U.S. Pat. No. 4,103,000 may be avoided.

DETAILED DESCRIPTION OF THE INVENTION

The copper metal utilised in the practice of this invention may be in any convenient particulate form which provides a sufficient surface area for reaction. The copper may be in powdered form although larger particles, for example turnings or even scrap copper, may alternatively be used. Preferably the copper is in reactive form and it may, advantageously, be mildly etched, for example with a dilute mineral acid/hydrogen peroxide mixture to ensure this.

The source of 5-valent arsenic is preferably arsenic acid. Sodium arsenate may alternatively be used although the consequent inclusion of sodiuim ions into the composition may not be preferred. Arsenic trioxide may also, alternatively, be used. Suitably, the arsenic compound is used in the form of an aqueous solution or suspension, preferably an aqueous solution of at lest 50% by weight concentration but particularly peferably of at least 65% by weight concentration for example, suitably, from about 75% to about 80% by weight concentration and preferably not more than about 95% by weight concentration.

The hydrogen peroxide utilised in the practice of this invention is suitably used as an aqueous solution having a concentration of about 30% by weight to about 85% by weight although it is preferred to use hydrogen peroxide having a concentration of from about 50% to about 75% by weight.

The overall stoichiometry of the reaction between copper metal and arsenic cid in the presence of hydrogen peroxide may be stated by the formula

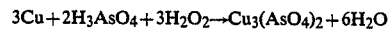

$$3Cu + 2H_3AsO_4 + 3H_2O_2 \rightarrow Cu_3(AsO_4)_2 + 6H_2O$$

Reference hereafter to stoichiometry is with reference to the quantities expressed in the above formula. The arsenic:copper ratio stated in the above equation corresponds to that required in the copper/chrome/arsenic composition Type A identified above. As it is seen from the other Standards quoted above, compositions containing more arsenic inrelation to copper may be required for certain timber preservation applications.

Preferably, according to this invention, the entire content of arsenic required in the final wood preservative composition, or at least the majority of it, for example at least 75% of it, or more suitably at least 90% of it, is supplied as the source of 5-valent arsenic specified above. The quantity of the source of 5-valent arsenic relative to the quantity of copper is preferably therefore from about 90% stoichiometric to about 500% stoichiometric or more i.e. up to about 1000% stoichiometryic if required. It has been found to be beneficial to conduct the reaction in an aqueous liquid medium having a substantial volume in relation to the quantity of the copper metal and the inclusion of the entire or substantially entire arsenic content of the desired wood preservative compostion in the reaction medium as above taught assists in this by increasing the volume of the reaction mixture without entailing undue dilution with water which would act to decrease reaction efficiency and also assists in pH control. Preferably the initial pH of the reaction medium is less than 1.0 particularly preferably less than 0.8.

It is a feature of the present invention that the hydrogen peroxide may advantageously be used in an excess over the stoichiometric quantity in order to increase the reaction efficiency. The excess is preferably at least 20% and particulary preferably at least 40% although it may be found to be beneficial to utilise a molar excess of hydrogen peroxide of from, for example, up to 200%.

The reaction according to the present invention is preferably carried out by establishing a body of an aqueous phase containing the source of 5-valent arsenic and the copper metal and lastly introducing the hydrogen peroxide. Preferably the addition of the hydrogen peroxide is carried out slowly, for example over a period of at least 4 hours for example from 4 hours to 24 hours. This apparently reduces the proportion of hydrogen peroxide lost through decomposition and increases the reaction efficiency. The reaction is preferably conducted under slightly elevated temperature conditions, for example at from 35° C., particularly preferably from 45° C. to below reflux temperature, preferably below 100° C. and particularly preferably below 95° C., to minimise decomposition of the hydrogen peroxide. It is preferred not to allow reflux to occur since this tends to reduce the efficiency of the process. It is further preferred not to utilise an oxygen or air sparge since this also tends to reduce the efficiency of the process.

The method of achieving efficient contact between the hydrogen peroxide-containing liquid reaction medium and the copper metal will depend to a great extent on the physical form of the copper. When the copper is finely divided or is in relatively small pieces it is preferred to agitate the liquid medium sufficienlty to suspend the copper, by for example, mechanical stirring. If the copper is scrap copper which may be in the form of bales comprising quite large pieces, for example plumbers scrap, it may be desired to pass the liquid medium over the surface of the scrap copper in the form of a bed or a packed column. Advantageously the scrap copper is first shredded. The contact between the hydrogen peroxide containing liquid reaction medium may advantageously be continued after the addition of the hydrogen peroxide to the medium has been completed for example for at least 15 minutes and possibly up to 3 hours or more.

The overall reaction between the copper metal, the source of 5-valent arsenic and the hydrogen peroxide is found to be exothermic. On a laboratory scale this was found to be insufficient to maintin the desired temperature, particularly at the upper and of the reaction temperature range envisaged. On a commercial scale, however, external heating may be unnecessary and cooling may even be required.

The direct product of the above reaction is a slurry of copper arsenate. This slurry product may be utilised in the production of copper/chrome/arsenic wood preservative compositions in the same manner as taught in the disclosure of U.S. Pat. No. 4,103,000 namely the production of such compositions by the mere addition of the required quantity of chromic acid and, if it has not been included as excess rectant, any required further quantity of a source of 5-valent arsenic. Alternativley, the product of this invention may be utilised in the manufacture of copper/chrome/arsenic wood preservative compositions by mixing it with sodium dichromate and a sufficient quantity of an added acid such as a strong mineral acid, to ensure that a water-soluble end-product is obtained in the manner described in our copending United Kingdom Patent Application No. 8601570.

The invention will now be illustrated by reference to the following specific examples thereof.

EXAMPLES 1 TO 9

A series of experiments were conducted which varied specific process conditions from a standard process. According to the standard process arsenic acid (80% wt concn) and new copper wire which had been etched with a dilute acid/hydrogen peroxide mixture and water washed (0.91 mm diameter, 10 mm lengths) were placed in a reaction vessel fitted with stirring means and thermostatically controlled heating means and 50% wt concentration aqueous hydrogen peroxide was added slowly over a period of 4 hours with stirring at 500 revolutions per minute (rpm). The reactants were used in a stoichiometry relative to the copper, the hydrogen peroxide being in a 150% stoichiometry arsenic acid in a 190% stoichiometry. This gives a copper arsenate product having a copper to arsenic ratio as specified in the Type C copper/chrome/arsenic Standard referred to above. The reaction temperature was maintained at 90° C. After the addition of the hydrogen peroxide had been completed stirring was continued for a further 2 hours. The copper arsenate precipitate was filtered off and disolved to allow the determination of the weight of any residual copper and the calculated reaction efficiency was based on the weight of copper found to have reacted. The Standard process gave an efficiency, so calculated, of 89.1%.

| Example No | Condition varied from Standard | Reaction Efficiency % |
|---|---|---|
| 1 | None | 89.1 |
| 2 | H$_2$O$_2$ stoichiometry 100% | 77.6 |
| 3 | Reaction temperature 50° C. | 62.9 |
| 4 | Reaction temperature 50° C. Addition + stirring times 2 + 1 hours | 41.3 |
| 5 | Reaction temperature 50° C. and addition + stirring times 8 + 2 hours | 85.5 |
| 6 | Arsenic acid 900% stoichiometry | 93.3 |
| 7 | Arsenic acid 100% stoichiometry but diluted to 25% wt concentration | 40.6 |
| 8 | Air sparge added to supplement agitation and arsenic acid 272% stoichiometry | 18.1 |
| 9 | Speed of stirrer reduced to | 54.9 |

| Example No | Condition varied from Standard | Reaction Efficiency % |
|---|---|---|
| | 250 rpm (no sparge) | |

What is claimed is:

1. A process for the production of copper arsenate suitable for conversion into a copper/chrome/arsenic wood preservative composition, which comprises; forming an aqueous reaction mixture consisting essentially of copper metal, a 5-valent arsenic compound in stoichiometric excess, relative to the copper, and an oxidizing agent consisting essentially of hydrogen peroxide in a stoichiometric excess of at least 20% for the reaction $$3Cu + 2H_3AsO_4 + 3H_2O_2 = Cu_3(AsO_4)_2 + 6H_2O;$$

maintaining the reaction mixture at a temperature of from 35° C. to below reflux temperature and in agitation until the copper has been consumed; and recovering a copper arsenate product.

2. A process as claimed in claim 1 wherein the source of 5-valent arsenic is selected from arsenic acid, sodium arsenate and arsenic trioxide.

3. A process as claimed in claim 1 wherein the source of 5-valent arsenic has a concentration of at least 50% by weight.

4. A process as claimed in claim 3 wherein the source of 5-valent arsenic has a concentration in the reaction mixture of at least 65% by weight.

5. A process as claimed in claim 1 wherein the source of 5-valent arsenic is present in a stoichiometric excess of at least 100% relative to the copper.

6. A process as claimed in claim 1 wherein the hydrogen peroxide is in the form of an aqueous solution having a concentration of from 30% to 85% by weight.

7. A process as claimed in claim 6 wherein the hydrogen peroxide solution has a concentration of at least 50% by weight.

8. A process as claimed in claim 1 wherein an aqueous solution of hydrogen peroxide is added to an agitated aqueous phase containing particles of the copper and the source of 5-valent arsenic the addition being conducted over a period of at least 4 hours.

9. A process for the production of a copper/chrome/arsenic wood preservative composition comprising adding to the copper arsenate product of a process as claimed in claim 1 a source of chromium.

* * * * *

UNITED STATES PATENT AND TRADEMARK OFFICE
CERTIFICATE OF CORRECTION

PATENT NO. : 4,804,494

DATED : February 14, 1989

INVENTOR(S) : Ian K. Egerton and Andrew D.J. Broome

It is certified that error appears in the above—identified patent and that said Letters Patent is hereby corrected as shown below:

Col. 1, line 64; "consistng" should read -- consisting -- .

Col. 2, line 18; "phse" should read -- phase -- .

Col. 2, line 43; "lest" should read -- least -- .

Col. 2, line 44; "peferably" should read -- preferably -- .

Col. 2, line 56; "cid" should read -- acid -- .

Col. 2, line 67; "inrelation" should read -- in relation -- .

Col. 3, line 15; "compostion" should read -- composition -- .

Col. 3, line 53; "sufficienlty" should read -- sufficiently -- .

Col. 4, line 1; "maintin" should read -- maintain -- .

Col. 4, line 13; "rectant" should read -- reactant -- .

Col. 4, line 14; "Alternativley" should read -- Alternatively -- .

Col. 4, line 47; "disolved" should read -- dissolved -- .

Col. 5, Claim 1; line 6 of Claim 1; before the word "stoichiometric" insert -- a -- .

Signed and Sealed this

Twelfth Day of December, 1989

Attest:

JEFFREY M. SAMUELS

Attesting Officer     Acting Commissioner of Patents and Trademarks